US006921894B2

United States Patent
Swierkowski

(12) United States Patent
(10) Patent No.: US 6,921,894 B2
(45) Date of Patent: Jul. 26, 2005

(54) FIBER OPTIC MICRO ACCELEROMETER

(75) Inventor: Steve P. Swierkowski, Livermore, CA (US)

(73) Assignee: The Regents of the University of California, Oakland, CA (US)

(*) Notice: Subject to any disclaimer, the term of this patent is extended or adjusted under 35 U.S.C. 154(b) by 106 days.

(21) Appl. No.: 10/238,660

(22) Filed: Sep. 10, 2002

(65) Prior Publication Data

US 2004/0046111 A1 Mar. 11, 2004

(51) Int. Cl.⁷ .................................................. G01J 1/34
(52) U.S. Cl. .............................. 250/227.21; 250/231.1
(58) Field of Search .................. 250/227.19, 227.21, 250/231.1; 356/477

(56) References Cited

U.S. PATENT DOCUMENTS

| | | | |
|---|---|---|---|
| 4,595,830 A | | 6/1986 | McMahon |
| 5,202,939 A | | 4/1993 | Belleville et al. |
| 5,218,420 A | * | 6/1993 | Asmar ........................ 356/480 |
| 5,276,322 A | | 1/1994 | Carome |
| 5,392,117 A | | 2/1995 | Belleville et al. |
| 5,628,917 A | | 5/1997 | MacDonald et al. |
| 5,891,747 A | | 4/1999 | Farah |
| 5,990,473 A | | 11/1999 | Dickey et al. |
| 6,175,108 B1 | | 1/2001 | Jones et al. |
| 6,581,465 B1 | * | 6/2003 | Waters et al. ............ 73/514.26 |
| 6,671,055 B1 | | 12/2003 | Wavering et al. |

FOREIGN PATENT DOCUMENTS

| | | |
|---|---|---|
| EP | 1 083 429 A2 | 3/2001 |
| EP | 1 083 429 A3 | 1/2002 |

OTHER PUBLICATIONS

Uttamchandani et al., "A micromachined silicon accelerometer with fibre optic interrogation," May 29, 1992, IEEE Coloquium on Fibre Optics Sensor Technology, pp. 4/1–4/4.*

Plaza et al., "Stress free quad beam optical silicon accelerometer," Sensors IEEE, Jun. 12–14 2002, pp. 1064–1068.*

Guldimann et al., "Fiber–optic accelerometer with micro–optical shutter modulation and integrated damping," Optical MEMS IEEE, Aug. 21–24, 2000, pp. 141–142.*

* cited by examiner

Primary Examiner—Thanh X. Luu
(74) Attorney, Agent, or Firm—Eddie E. Scott; Alan H. Thompson

(57) ABSTRACT

An accelerometer includes a wafer, a proof mass integrated into the wafer, at least one spring member connected to the proof mass, and an optical fiber. A Fabry-Perot cavity is formed by a partially reflective surface on the proof mass and a partially reflective surface on the end of the optical fiber. The two partially reflective surfaces are used to detect movement of the proof mass through the optical fiber, using an optical detection system.

27 Claims, 4 Drawing Sheets

FIBER OPTIC MICRO ACCELEROMETER

The United States Government has rights in this invention pursuant to Contract No. W-7405-ENG-48 between the United States Department of Energy and the University of California for the operation of Lawrence Livermore National Laboratory.

BACKGROUND

1. Field of Endeavor

The present invention relates to accelerometers and more particularly to a fiber optic micro accelerometer.

2. State of Technology

U.S. Pat. No. 4,595,830 for a multimode optical fiber accelerometer by Donald McMahon issued Jun. 17, 1986 provides the following information, "Accelerometers of the prior art include devices comprising a proof mass affixed to the end of an elastic beam. The elastic beam, owing to the inertia of the affixed proof mass, bends upon acceleration, providing a measurement thereof. Alternatively, upon acceleration, a feedback loop generates a countervailing force which maintains the original position of the proof mass. The acceleration is derived from a measurement of the necessary compensating force. Sensors in these prior art devices for detecting relevant changes from which the acceleration may be calculated, comprise mechanical or electromagnetic means, or combinations thereof. Thus, there is a need for an efficacious accelerometer entailing optical, in particular, optical fiber sensors."

U.S. Pat. No. 5,276,322 for a fiber optic accelerometer by Edward Carome issued Apr. 1, 1994 provides the following information, "Heretofore, the acceleration and vibration sensors have been primarily of electromechanical nature. One prior art acceleration sensor uses a mercury switch which is configured such that the selected acceleration moves the mercury to a position in which it closes an electrical connection between leads. Prior art vibration sensors utilize electrical conductors moving with respect to magnetic fields or piezoelectric elements that produce electric signals proportional to acceleration. Fiber optic accelerometers of numerous designs are available. The fiber optic systems have numerous advantages over mechanical and electromechanical accelerometers, such as their increased sensitivity and immunity to electrical interference. However, the fiber optic accelerometers tend to be relatively expensive. Moreover, the fiber optic accelerometers are not as amenable to automated manufacture as the prior art electromechanical and electrical acceleration sensors."

U.S. Pat. No. 6,175,108 for an accelerometer featuring fiber optic bragg grating sensor for providing multiplexed multi-axis acceleration sensing by Richard Jones, et al. issued Jan. 16, 2001 provides the following information, "Accelerometers are known in the prior art that use an optical fiber. Such accelerometers measure acceleration by sensing optical fiber surface strain, by sending optical fiber displacement or microbending, by sensing optical signal intensity, and by sensing optical signal phase shifts. One disadvantage of the prior art accelerometers is that they are all complicated point sensors that do not allow multiplexing. Instead, a separate prior art accelerometer is needed to sense each respective axis."

SUMMARY

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides an accelerometer. The accelerometer includes a wafer, a proof mass operatively connected to the wafer, at least one spring member operatively connected to the proof mass, a partially reflective surface integrated into the proof mass, an optical fiber operatively connected to the wafer, a partially reflective surface on the optical fiber, and sensor means operatively connected to the optical fiber for detecting movement of the proof mass. The wafer contains a groove for receiving the optical fiber. In one embodiment, a Fabry-Perot cavity is located between the partially reflective surface on the optical fiber and the partially reflective surface that is operatively connected to the proof mass. In one embodiment, a means for encapsulating the wafer and the proof mass includes a first side plate and a second side plate with the proof mass positioned between the first side plate and the second side plate. In one embodiment, the wafer contains a groove for receiving the optical fiber and including bonding material wicking dump channels operatively connected to the groove.

In one embodiment, a method of producing an accelerometer is provided that includes microprocessing a wafer to produce a proof mass, at least one spring member, and a channel for receiving an optical fiber. A first side plate and a second side plate are positioned adjacent the wafer, the proof mass, the at least one spring member, and the channel. The first side plate and the second side plate are bonded to the wafer and an optical fiber is connected to the wafer. In one embodiment, the step of positioning and connecting a first side plate and a second side plate to the wafer comprises bonding the first side plate and the second side plate to the wafer. In one embodiment, a temperature-time profile is used during the bonding. A partially reflective surface is integrated into the proof mass and a partially reflective surface is provided on the optical fiber. The partially reflective surface that is operatively connected to the proof mass and the partially reflective surface on the optical fiber are opposite from each other. In one embodiment, a Fabry-Perot cavity is located between the partially reflective surface on the optical fiber and the partially reflective surface that is operatively connected to the proof mass. Sensor means are provided for detecting movement of the proof mass. The wafer and the proof mass remain encapsulated during processing.

The invention is susceptible to modifications and alternative forms. Specific embodiments are shown by way of example. It is to be understood that the invention is not limited to the particular forms disclosed. The invention covers all modifications, equivalents, and alternatives falling within the spirit and scope of the invention as defined by the claims.

BRIEF DESCRIPTION OF THE DRAWINGS

The accompanying drawings, which are incorporated into and constitute a part of the specification, illustrate specific embodiments of the invention and, together with the general description of the invention given above, and the detailed description of the specific embodiments, serve to explain the principles of the invention.

DETAILED DESCRIPTION OF THE INVENTION

Figure 1:
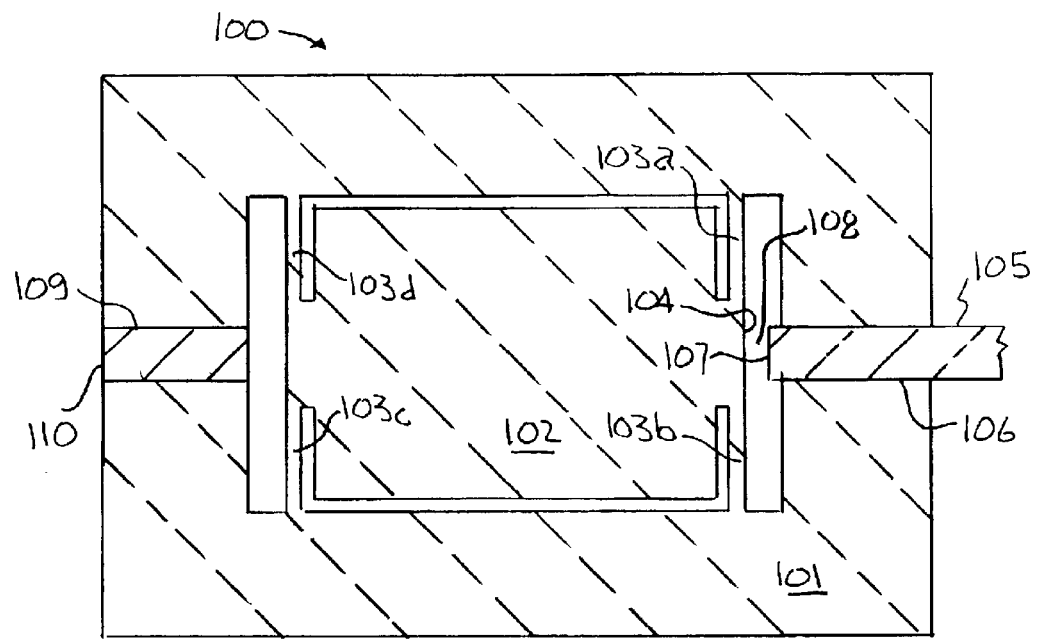
FIG. 1 illustrates one embodiment of a fiber optic micro accelerometer constructed in accordance with the present invention.

Referring now to the drawings, to the following detailed information, and to incorporated materials; a detailed description of the invention, including specific embodiments, is presented. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

The vast majority of accelerometers use a sensing element on a chip that requires electrical power input, and the output signal is an electrical output signal. The present invention is a departure from this. The present invention provides a completely passive sensing element that is very small, and is optically interrogated remotely—possibly very far away (e.g., 1 km). This is ideal for explosive environments [no wires going in/out] and places where readout electronics [often not very small] and power are not desired, i.e., ends of ship propellers, composite rudder fin structures of airplanes, automotive sensing, RFI intensive environments—arcing and lightning proof, in electrical machines, etc.

Referring now to FIG. 1, one embodiment of a fiber optic micro accelerometer constructed in accordance with the present invention is illustrated. The fiber optic micro accelerometer embodiment is designated generally by the reference numeral 100. The structural elements of the accelerometer 100 will now be summarized. The accelerometer 100 includes a wafer 101. The wafer 101 is a thin piece of material used as a structural component and/or optical component. The wafer 101 can be made of silicon or other material. A proof mass 102 is incorporated in the wafer 101. At least one spring member 103A is operatively connected to the proof mass 102. The accelerometer 100 measures acceleration. Because it is difficult to measure acceleration directly, the accelerometer 100 measures movement of the proof mass 102 suspended by the at least one spring member 103A. A partially reflecting surface 104 is integrated into the proof mass 102. An optical fiber and sensor means 105 for detecting movement of the proof mass 102 is optically coupled to the partially reflecting surface 104. The optical fiber and sensor means 105 can be any of the state of the art optical fiber and sensor means. For example, the optical fiber and sensor means 105 can be a system that uses the white light interferometer effect of a Fabry-Perot cavity.

The accelerometer 100 is useful for detecting and measuring motions in mechanical structures such as physics experiments, explosive environments, industrial machinery, bridges, automobiles, planes, missiles and other equipment. The accelerometer 100 provides a passive sensing element that is very small and is optically interrogated remotely. The accelerometer 100 can be optically interrogated remotely from long distances. This is ideal for explosive environments. The accelerometer 100 is useful in explosive environments and in environments where electrical sparks and noise create problems because there are no wires going in or out of the accelerometer 100 and the readout electronics and power source are at a remote location. There is no stored energy in the accelerometer. The accelerometer 100 provides results that are useful for determining forces, failures and failure prediction, and navigation, to name just a few of many applications. It is particularly well suited to: a.) minimally invasive probes, b.) explosive or hazardous or extreme environments since no wires are employed and the package is extremely robust, c.) sensor applications with high EMI, and d.) remote readout instruments without loss of fidelity.

The accelerometer 100 will now be described in greater detail. The accelerometer 100 is constructed using IC (integrated circuit) microfabrication technologies. Microfabricated devices are formed using crystalline substrates, such as silicon and gallium arsenide, but may be formed on non-crystalline materials, such as glass or certain polymers. The shapes of crystalline devices can be precisely controlled. Micromachined and etched surfaces and shapes are readily produced. The materials may be bonded by processes such as adhesive bonding, fusion at elevated temperatures, anodic bonding, or field-assisted methods. Microfabrication technology enables the production of electrical, mechanical, electromechanical, optical, chemical and thermal devices. The integration of these microfabricated devices into a single system allows for the batch production of microscale instruments.

The proof mass 102 is incorporated in the wafer 101 by microprocessing. The proof mass 102 can be created by micromachining the wafer 101 to incorporate the proof mass 102 or by other processing methods such as etching. The proof mass 102 has at least one spring member 103A. A partially reflecting surface 104 is operatively connected to the proof mass 102. An optical fiber 105 is optically coupled to the partially reflecting surface 104. The wafer 101 contains a groove 106 for receiving the optical fiber 105. The groove 106 can include an insertion funnel for receiving the optical fiber 105. The optical fiber 105 has a partially reflecting end surface 107. A Fabry-Perot cavity 108 is located between the end surface 107 of the optical fiber 105 and the partially reflecting surface 104. A Fabry-Perot cavity is an optical resonator in which feedback is accomplished by two parallel planes. The partially reflecting surface 104 forms one mirror of the Fabry-Perot optical cavity 108. The other mirror of the Fabry-Perot cavity 108 is formed by the partially reflecting end surface 107 of the optical fiber 105. An optical readout of the position of the proof mass 102, relative to the wafer 101, is achieved by a remote external optical system that illuminates the mirrors and also measures the reflected light as is well know in the art.

The basic structural details of one embodiment of a fiber optic micro accelerometer constructed in accordance with the present invention have been described. Some additional details of other embodiments of the accelerometer 100 will now be described. The accelerometer 100 includes a proof mass 102 that is approximately rectangular with four individual corners. The spring member system includes at least one spring member 103A operatively connected to the proof mass 102. Additional spring members may be included. For example, the spring members 103B, 103C and 103D may be included. The spring members 103A, 103B, 103C and 103D are located proximate each of the four corners of the proof mass 102. The accelerometer 100 may include means for encapsulating the wafer 101 and the proof mass 102. The means for encapsulating the wafer 101 and the proof mass 102 can include a first side plate and a second side plate with the proof mass positioned between the first side plate and the second side plate. A second groove 109 may be provided in the wafer 101. The second groove 109 may contain a plug 110 or it may contain another optical fiber.

Figure 2:
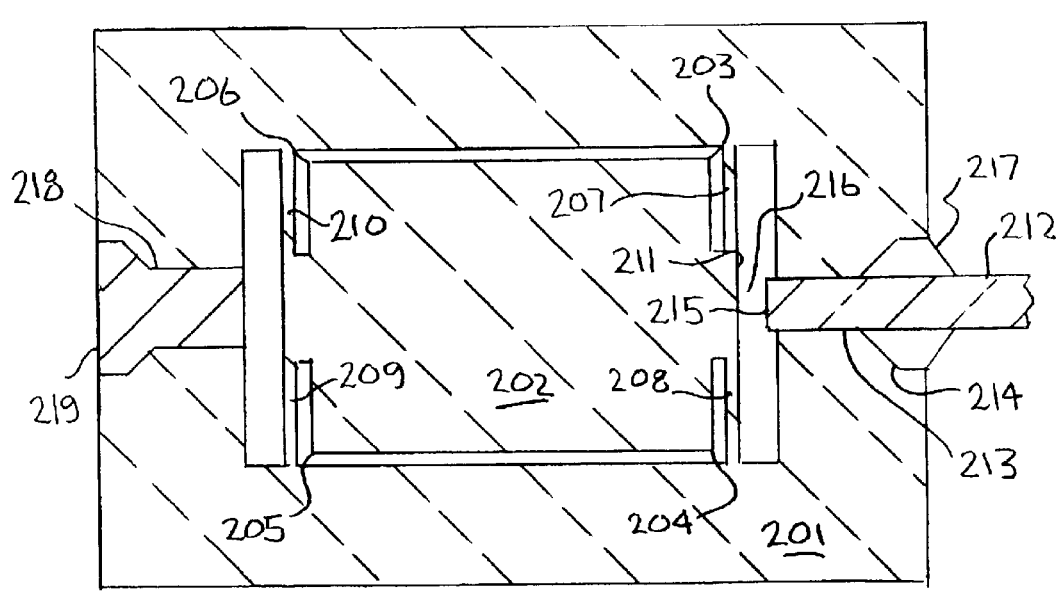
FIG. 2 shows a top view of one embodiment of an accelerometer constructed in accordance with the present invention.
Figure 3:
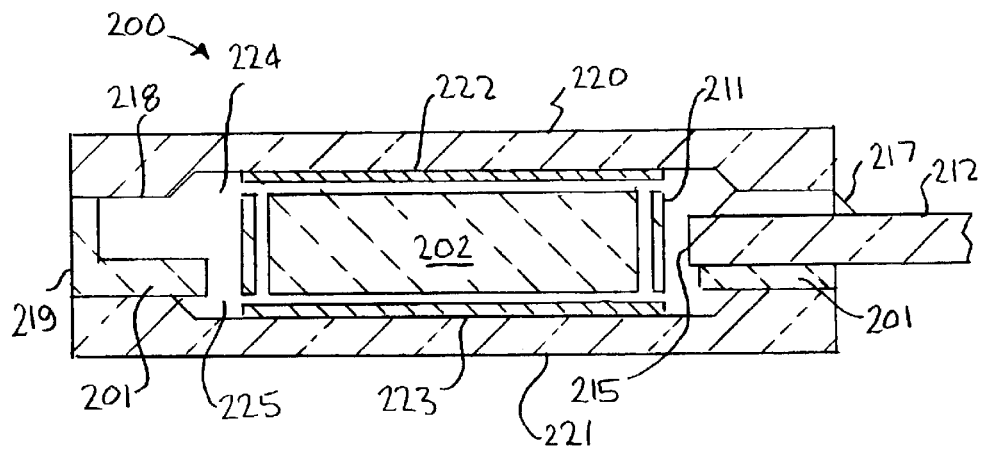
FIG. 3 shows a side view of one embodiment of an accelerometer constructed in accordance with the present invention.

Referring now to FIGS. 2 and 3, another embodiment of a fiber optic micro accelerometer constructed in accordance with the present invention is illustrated. This fiber optic micro accelerometer embodiment is designated generally by the reference numeral 200. A top view of the accelerometer 200 is shown in FIG. 2 and a side view of accelerometer 200 is shown in FIG. 3.

The accelerometer 200 is constructed using microfabrication technologies. Microfabrication technology enables the production of electrical, mechanical, electromechanical, optical, chemical and thermal devices. The accelerometer 200 is useful for determining forces, failures and failure prediction, and navigation, to name just a few of many applications. The accelerometer 200 can detect and measure motions in mechanical structures such as physics experiments, explosive environments, industrial machinery, bridges, automobiles, planes, missiles and other equipment. The accelerometer 200 is particularly well suited to: a.) minimally invasive probes, b.) explosive or hazardous or extreme environments since no wires are employed and the package is extremely robust, c.) sensor applications with high EMI, and d.) remote readout instruments without loss of fidelity. The accelerometer 200 provides a passive sensing element that is very small and is optically interrogated remotely. The accelerometer 200 can be optically interrogated remotely from long distances. This is ideal for explosive environments. The accelerometer 200 is useful in explosive environments and in environments where electrical sparks and noise create problems because there are no wires going in or out of the accelerometer 200 and the readout electronics and power source are at a remote location. There is no stored energy in the accelerometer.

Referring now to FIG. 2, a top view of the accelerometer 200 is shown. The accelerometer 200 comprises a wafer 201. The wafer 201 is a thin piece of material used as a structural component and optical component. The wafer shown is 7 mm long and 4.4 mm wide; however, it is to be understood that the wafer and other components can be made much smaller. The wafer 201 can be made of silicon or other material. A proof mass 202 is incorporated in the wafer 201. The proof mass 202 is incorporated in the wafer 201 by microprocessing. The proof mass 202 can be created by micromachining the wafer 201 to incorporate the proof mass 202 or by other processing methods such as etching. The proof mass 202 is approximately rectangular with four individual corners 203, 204, 205, and 206. Spring members are operatively connected to the proof mass 202. The spring members 207, 208, 209, and 210 are located proximate each of the corners 203, 204, 205, and 206 of the proof mass 202. The spring members 207, 208, 209, and 210 enable a high compliance only along the desired sensitive axis, which is collinear with the microetched fiber channel. Because it is difficult to measure acceleration directly, the accelerometer 200 measures movement of a proof mass suspended by the spring members 207, 208, 209, and 210.

An optical fiber 212 is connected to the wafer 201. The optical fiber 212 has a 125 micrometer diameter fiber; however, it is to be understood that other diameter fibers can be used. The optical fiber 212 is a typical multimode optical fiber. While it is possible to use a single mode optical fiber, there are advantages in using a multimode optical fiber. The multimode wide bandwidth (i.e., white light) system has many practical advantages. The wafer 201 contains a groove 213 for receiving the optical fiber 212. The groove 213 can include an insertion funnel 214 for receiving the optical fiber 212. Optionally, another groove 218 may be provided in the wafer 201. The second groove 218 may contain a plug 219 or it may contain another optical fiber. The optical fiber 212 is bonded to the wafer 201 by bond material 217 such as an adhesive or a solder alloy for hermetic sealing and fixing the position of the partially reflecting mirror 215.

The optical fiber 212 has a partially reflecting end surface 215. The partially reflecting surface 211 is integrated into the proof mass 202. A Fabry-Perot cavity 216 is located between the partially reflecting end surface 215 of the optical fiber 212 and the partially reflecting surface 211. The Fabry-Perot (FP) cavity was invented in the late 1800s. It essentially consists of two parallel plane optical mirrors; the mirrors may be fully or partially reflective and partially transmissive. For example, a partial mirror may be obtained on the flat end of an optical fiber. A partially reflective, non-transmissive mirror may be a micromachined smooth surface on silicon. The FP cavity operation has been thoroughly studied for many years and it is discussed in many optics textbooks; for example the classic textbook "Principles of Optics," by Born and Wolf, MacMillan 1959 discusses the operating principles. The performance of the FP cavity is strongly determined by the mirror gap spacing—as well as many other factors such as mirror smoothness, mirror flatness, geometrical alignment to an optical axis, degree of parallelism, etc. The cavity gap determines the optical resonance of the cavity where single wavelength light is used; this effect has been used for many, many years for optical filtering. For the broadband light that is used to interrogate the accelerometer 200, the cavity gap (which is about 5–25 micrometers) strongly determines the phases present for the different wavelengths that are present in the reflected light. This complex reflected spectrum has phase information in it that can be processed by an optical receiver system that will determine the gap at the FP cavity with a very high degree of accuracy and stability, as has been previously demonstrated.

The transmissive and/or reflective properties are a strong function of the optical and geometrical factors making up the cavity. Any physical effect, such as temperature, that changes a cavity parameter, can be sensed by the optical characterization of the cavity. In fact, much extreme effort has been put into making various FP systems invariant to environmental factors such as temperature, mechanical strain, pressure, acceleration, etc. The use of an optical interferometric component(s) to make a physical parameter sensing system has been used for many years. It is the detail of the system design and its fabrication method, that makes each system unique, and specialized. One major difficulty has always been to make a FP sensor that senses the desired physical parameter well, while also discriminating against other effects.

The Fabry-Perot cavity 216 is an optical resonator in which feedback is accomplished by two parallel planes. The partially reflecting surface 211 forms one mirror of the Fabry-Perot optical cavity 216. The other mirror of the Fabry-Perot cavity 216 is formed by the partially reflecting end surface 215 of the optical fiber 212. An optical readout of the position of the proof mass 202, relative to the wafer 201, is achieved by a remote external optical system that illuminates the mirrors and also measures the reflected light as is well know in the art.

Referring now to FIG. 3, a side view of the accelerometer 200 is shown. The accelerometer 200 includes means for encapsulating the wafer 201 and the proof mass 202. A first side plate 220 and a second side plate 221 are used to hermetic seal the accelerometer 200. The first side plate 220 and the second side plate 221 have recess sections 224 and 225 that provide a space for the proof mass 202. The recess sections 224 and 225 provide a simple non-critically aligned glass recess feature makes sure the proof mass is constrained for large out-of-plane motion, protecting the device from severe overrange handling, which can cause beam breakage. Metallic screening electrodes 222 and 223 are positioned in the recess sections 224 and 225. The accelerometer 200 measures acceleration. Because it is difficult to measure acceleration directly, the accelerometer 200 measures movement of the proof mass suspended by the spring members 207, 208, 209, and 210.

The first side plate 220 and the second side plate 221 are positioned over and below the wafer 201 and the proof mass 202 and bonded to the wafer 201. A glass/silicon/glass wafer bonding scheme is used with integral alignment to 50 micrometers. All 200+ parts on a single small 75 mm wafer are aligned and packaged at once; the package/sensor is bonded at +350° C. A temperature-time profile is used during the bonding process that not only produces a very strong bond, but also minimizes the residual strain (upon cooling to ambient) between the glass and the silicon. If uncontrolled, the silicon shrinks a lot more than the glass when cooling. This, in turn, puts the proof mass suspension beams under tension, which can have an adverse effect on their deflection characteristics and change the responsivity [nanometers of deflection/g of acceleration] of the device. The accelerometer 200 has been successfully plunge tested into liquid nitrogen (~–200° C.) and into boiling water (+100° C). This demonstrates that the accelerometer package is extremely robust.

Figure 4:
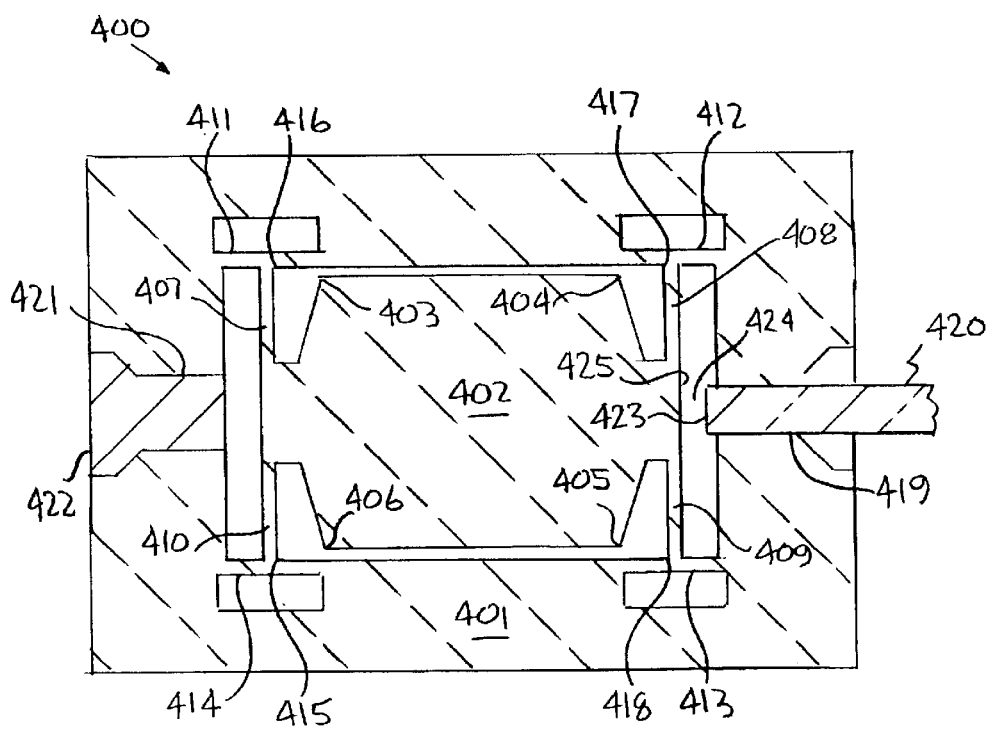
FIG. 4 illustrates another embodiment of a fiber optic micro accelerometer constructed in accordance with the present invention.

Referring now to FIG. 4, another embodiment of a fiber optic micro accelerometer constructed in accordance with the present invention is illustrated. This fiber optic micro accelerometer embodiment is designated generally by the reference numeral 400. The accelerometer 400 is constructed using microfabrication technologies. The accelerometer 400 can detect and measure motions in mechanical structures such as physics experiments, explosive environments, industrial machinery, bridges, automobiles, planes, missiles and other equipment.

The accelerometer 400 comprises a wafer 401. The wafer 401 is a thin piece of material used as a structural component and/or optical component. The wafer 401 can be made of silicon or other material. A proof mass 402 is incorporated in the wafer 401. The proof mass 402 is incorporated in the wafer 401 by microprocessing. The proof mass 402 is approximately rectangular with four individual corners 403, 404, 405, and 406. Eight spring member are operatively connected to the proof mass 402. The spring members 407, 408, 409, 410, 411, 412, 413, and 414 are located proximate the corners 403, 404, 405, and 406 of the proof mass 402.

The spring members provide a complex proof mass suspension system. The proof mass 402 is suspended by the four primary ribbon shaped beams 407, 408, 409, and 410 that enable a high compliance only along the desired sensitive axis, which is colinear with the microetched fiber channel. The primary beams 407, 408, 409, and 410 are terminated near the frame at the center of small orthogonal secondary stress relieving beams 411, 412, 413, and 414. The secondary beams 411, 412, 413, and 414 are designed to accommodate virtually all of any residual bonding stress caused by the different thermal expansion coefficients of silicon and glass. In other words, they relieve the tensional stress in the primary beams 407, 408, 409, and 410. These secondary beams 411, 412, 413, and 414 are also designed to be ribbon shaped, so that the out-of-plane compliance is very low. The suspension system has one fundamental low frequency resonance, well below other higher order modes, that is along the desired sensitive axis.

The accelerometer 400 has special design fillets for concave corner rounding at the ends of all the suspension beams and inside corners. This greatly improves their strength as it reduces the stress concentration. This special fillet has a gradual tapered section 415, in addition to the normal corner round. This feature negates the detrimental artifact of RIE etching where on inside corners, the proximity effect of the two adjacent sidewalls produces a slightly enhanced lateral etch rate. Without this special fillet, the suspension beams would experience a slight "necking" at their attachment points, caused by artifacts of micromachining, thus promoting premature failure at this location.

Because it is difficult to measure acceleration directly, the accelerometer 400 measures movement of the proof mass 402 suspended by the spring members 407, 408, 409, 410, 411, 412, 413, and 414. An optical fiber 420 is connected to the wafer 401. The optical fiber 420 has a 125 micrometer diameter fiber. The wafer 401 contains a groove 419 for receiving the optical fiber 420. Another groove 421 may be provided in the wafer 401. The second groove 421 may contain a plug 422 or it may contain another optical fiber.

The optical fiber 420 has a partially reflecting end surface 423. The partially reflecting surface 423 is optically coupled to the proof mass 402. A Fabry-Perot cavity 424 is located between the partially reflecting end surface 423 of the optical fiber 420 and a partially reflecting surface 425 on the proof mass 402. The Fabry-Perot cavity 424 essentially consists of two parallel plane optical mirrors; the mirrors may be fully or partially reflective and partially transmissive. The Fabry-Perot cavity 424 is an optical resonator in which feedback is accomplished by two parallel planes. The partially reflecting surface 425 forms one mirror of the Fabry-Perot optical cavity 424. The other mirror of the Fabry-Perot cavity 424 is formed by the partially reflecting end surface 423 of the optical fiber 420. An optical readout of the position of the proof mass 402, relative to the wafer 401, is achieved by a remote external optical system that illuminates the mirrors and also measures the reflected light as is well know in the art.

Figure 5:
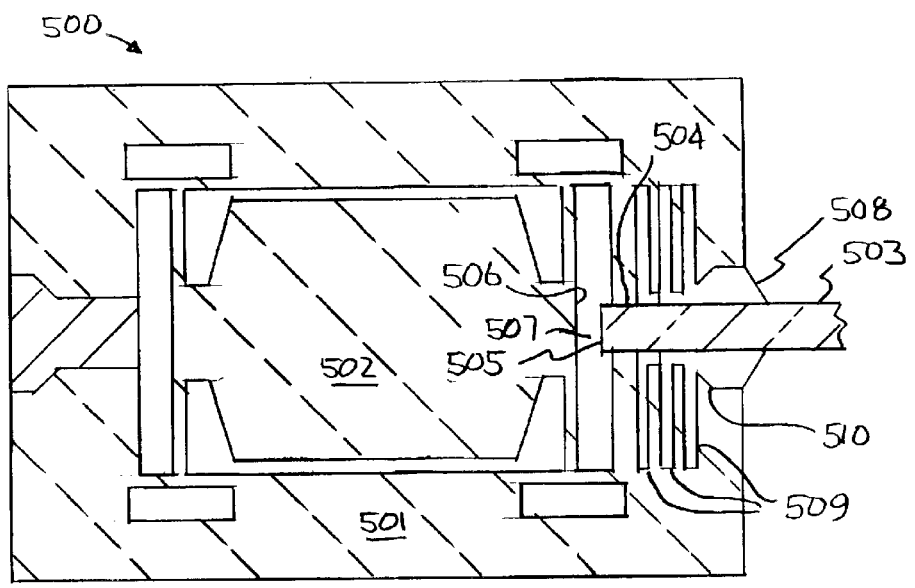
FIG. 5 illustrates another embodiment of a fiber optic micro accelerometer constructed in accordance with the present invention.

Referring now to FIG. 5, another embodiment of a fiber optic micro accelerometer constructed in accordance with the present invention is illustrated. This fiber optic micro accelerometer embodiment is designated generally by the reference numeral 500. The accelerometer 500 is constructed using microfabrication technologies. Because it is difficult to measure acceleration directly, the accelerometer 500 measures movement of a proof mass suspended by the spring members. The accelerometer 500 can detect and measure motions in mechanical structures such as physics experiments, explosive environments, industrial machinery, bridges, automobiles, planes, missiles and other equipment.

The accelerometer 500 is constructed in a similar fashion to the accelerometer previously described. The accelerometer 500 comprises a wafer 501 that is a thin piece of material used as a structural component and/or optical component. A proof mass 502 is incorporated in the wafer 501 by microprocessing. Spring members as previously described provide a complex proof mass suspension system. An optical fiber 503 is connected to the wafer 501. The optical fiber 503 is located in a groove 504.

The optical fiber 503 has a partially reflecting end surface 505. The partially reflecting surface 505 is optically coupled to a partially reflecting surface 506 on the proof mass 502. A Fabry-Perot cavity 507 is located between the partially reflecting end surface 505 of the optical fiber 503 and a partially reflecting surface 506 on the proof mass 502.

The optical fiber 503 is retained in the groove 504 by adhesives, soldering, or fusion bonding. Adhesive 508 is deposited at the entrance to the groove 504 between the optical fiber 503 and the groove 504. The groove is rectangular in shape and the optical fiber is generally round in shape. This leaves a space between the groove 504 and the optical fiber 503. The adhesive 508 is drawn into the space by capillary action. The accelerometer 500 includes adhesive wicking "dump" channels 509 on the sides of the main fiber channel 504. These narrow RIE etched grooves 509 strongly wick and divert the UV curable adhesive 508 as it initially wicks down the fiber channel 504 from the outside. These side channels 509 divert excess adhesive so it does not penetrate onto the fiber end 505, the Fabry-Perot cavity 507, or the partially reflecting surface 506. Adhesive on the internal surfaces of the accelerometer such as the fiber end 505, the Fabry-Perot cavity 507, or the partially reflecting surface 506 would ruin the device.

The accelerometer 500 is constructed using hermetic sealing to maintain the internal parts in strictly clean condition. Means are provide for encapsulating the wafer 501 and the proof mass 502. A first side plate and a second side plate are used to hermetic seal the accelerometer 500. The adhesive 508 that is deposited in the groove 504 between the optical fiber 503 and the groove 504 maintains the hermetic sealing. The accelerometer 500 has a tapered opening or funnel 510 for the main channel 504 of the optical fiber 503. It is exposed in the final RIE fiber port opening process. It makes it much easier to physically insert the fiber 503 into its precision machined channel 504 before the fiber 503 is bonded into place. Once the fiber 503 is bonded into the wafer 501, the sensor construction is complete.

Figure 6:
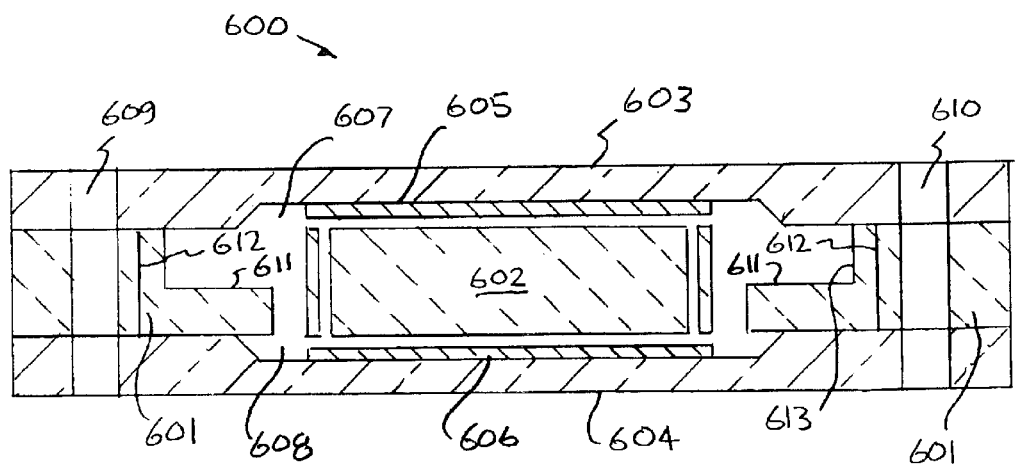
FIG. 6 illustrates another embodiment of a fiber optic micro accelerometer constructed in accordance with the present invention and an embodiment of a method of producing a fiber optic micro accelerometer.

Referring now to FIG. 6, another embodiment of a fiber optic micro accelerometer constructed in accordance with the present invention is illustrated and an embodiment of a method of producing a fiber optic micro accelerometer is described. This fiber optic micro accelerometer embodiment is designated generally by the reference numeral 600. The accelerometer 600 comprises a wafer 601. The wafer 601 is a thin piece of material used as a structural component and/or optical component. The accelerometer is typically 7 mm long and 4.4 mm wide, but could be much smaller. The wafer 601 can be made of silicon or other material and is typically 75 mm diameter. A proof mass 602 is incorporated in the wafer 601. The proof mass 602 is incorporated in the wafer 601 by microprocessing. The proof mass 602 can be created by micromachining the wafer 601 to incorporate the proof mass 602 or by other processing methods such as etching.

The accelerometer 600 is constructed using microfabrication technologies. Microfabricated devices are formed using crystalline substrates, such as silicon and gallium arsenide, but may be formed on non-crystalline materials, such as glass or certain polymers. The shapes of crystalline devices can be precisely controlled. Micromachined and etched surfaces and shapes are readily produced. The materials may be bonded by processes such as fusion at elevated temperatures, anodic bonding, or field-assisted methods. Microfabrication technology enables the production of electrical, mechanical, electromechanical, optical, chemical and thermal devices. The integration of these microfabricated devices into a single system allows for the batch production of microscale instruments.

The accelerometer 600 is produced by a "bulk" and "dry" micromachining process. This is used for many reasons. It is easy to make with common reactive ion etch (RIE). It makes useable sidewall mirrors. It has a large proof mass [etching all the way through silicon wafer versus "surface" type devices] and thus lower resonant frequency. The proof mass motion is in-plane which eliminates air cushion effect from normal-to-the-plane mass motion. RIE can accommodate arbitrary shaped designs for the geometrical features of the part (i.e., beams, fiber guides, proof mass, alignment holes and features, etc.). It has simple mask design, simple lithography and processing and avoids critical alignment and anisotropic wet etching of wafers used by many MEMS efforts. Dry processing avoids water spots and other liquid etch processing problems of microairbubbles. It provides uniformity, temperature control, etc.

The wafer 601 and the proof mass 602 are produced using a glass photomask. The desired pattern is produced on the starting wafer using an etch mask. The starting wafer is processed using an RIE etch. This is done from both sides of the starting wafer. The starting wafer is processed into the accelerometer frame 601 and the proof mass 602. The wafer 601 and the proof mass 602 are encapsulated between a first side plate 603 and a second side plate 604 to hermetic seal the accelerometer 600. A glass/silicon/glass wafer bonding scheme with integral alignment to 50 micrometers is used. The package/sensor is bonded at +350° C. A temperature-time profile is used during the bonding process that not only produces a very strong bond, but also minimizes the residual strain (upon cooling to ambient) between the glass and the silicon. If uncontrolled, the silicon shrinks a lot more than the glass when cooling. This, in turn, puts the proof mass suspension beams under tension, which can ruin their deflection characteristics and change the responsivity [nanometers of deflection/g of acceleration] of the device.

Metallic screening electrodes 605 and 606 are deposited on the plates 603 and 604, and they are simply pin-aligned through holes 609 and 610 with a shadow mask, and it makes an automatic connection to the patterned silicon just prior to anodic bonding. This eliminates a severe problem of electrostatic attraction that is always present during anodic bonding that can, and will usually, snap-down the proof mass 602 to one of the plates 603 or 604 and permanently stick it, thus ruining the part. This is a particularly severe problem when glass side plate recess regions are very close to the proof mass, which is desirable for large overrange protection. The glass recess feature 607 and 608 makes sure the proof mass is constrained for large out-of-plane motion, protecting the device from severe overrange handling, which can cause beam breakage.

The accelerometer 600 is produced using hermetic sealing during the bonding process, which enables wafer-level part dicing, dicing line 612, with a precision diamond grit saw, without risk of internal part contamination by wafer saw water and grit. The internal pressure inside the accelerometer 600 is maintained during the processing operations and external fluid and particles are prevented from entering the accelerometer 600. Once the channel 611 is opened during the final processing, by dry etching away the temporary plug 613, the internal pressure vents outward. The final parts are completely dry and clean when the fiber ports are opened up by one last short, non-critical, non-masked RIE process. The fiber port opening process insures that the residual moderate pressure inert gas inside the part flows from inside the part into the RIE etch chamber when the fiber port is first etched open, thus removing any particulate debris and preventing it from contaminating the interior of the device. The accelerometer 600 is easily amenable to practical mass production.

Figure 7:
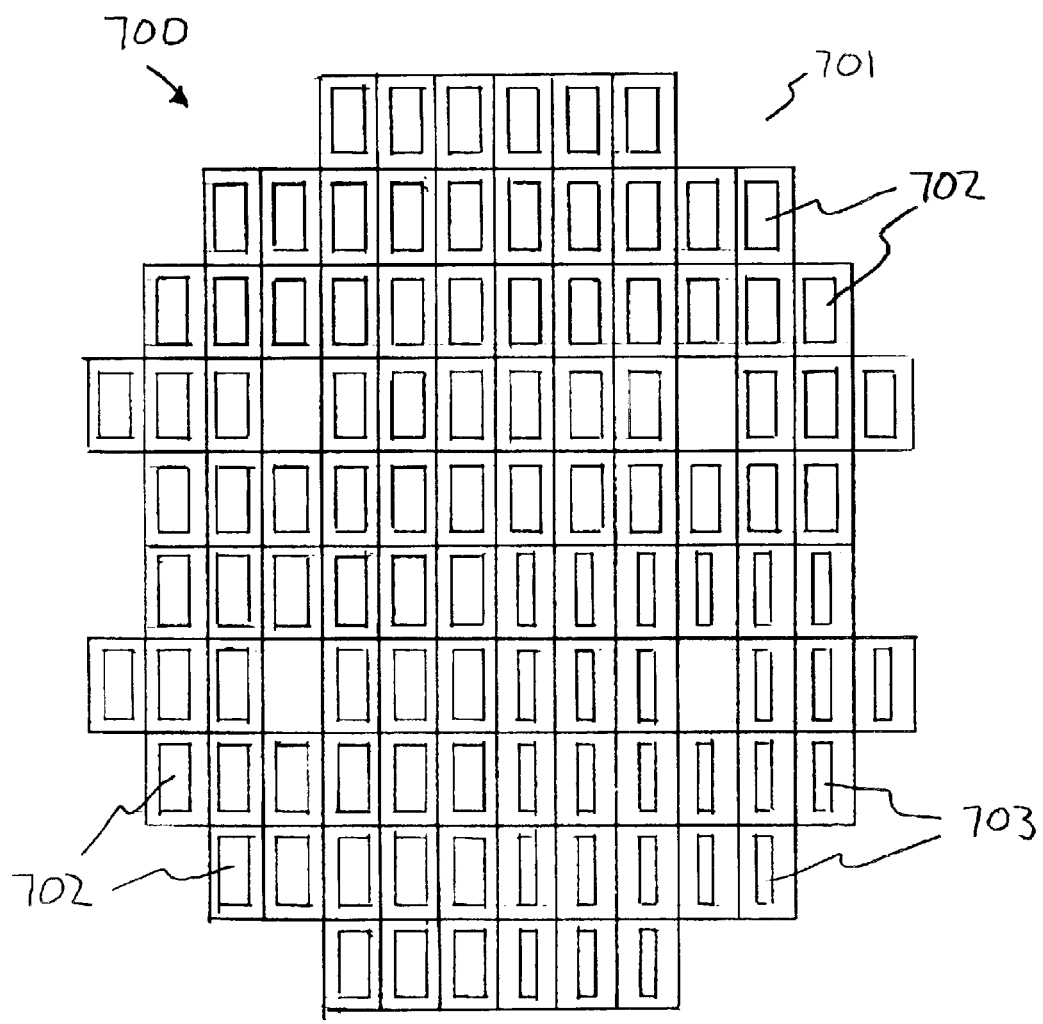
FIG. 7 illustrates another embodiment of a method of producing a fiber optic micro accelerometer in accordance with the present invention.

Referring now to FIG. 7, another embodiment of a method of producing a micro fiber optic accelerometer in accordance with the present invention is illustrated and described. This embodiment is designated generally by the reference numeral 700. A wafer disk 701, typically 75 mm, 100 mm, or larger contains a large number of individual sensor components 702 and other components 703. The wafer disk 701 allows the micro accelerometer to be produced by mass production. The method comprises producing an accelerometer including the steps of: microprocessing a wafer to produce a proof mass, at least one spring member, and a channel for receiving an optical fiber, positioning a first side plate and a second side plate adjacent the, wafer, the proof mass, the at least one spring member, and the channel and connecting the first side plate and the second side plate to the wafer, connecting an optical fiber to the wafer in the channel. The integration of these microfabricated devices into a single system allows for the batch production of microscale instruments.

The accelerometer is produced using hermetic sealing during the packaging process, which enables wafer-level part dicing with a precision diamond grit saw, without risk of internal part contamination by wafer saw water and grit. The accelerometer is produced by microprocessing a wafer to produce for each sensor component or chip: a proof mass, at least one spring member, and a channel for receiving an optical fiber, positioning a first side plate and a second side plate adjacent the, wafer, the proof mass, the at least one spring member, and the channel and connecting the first side plate and the second side plate to the wafer, connecting an optical fiber to the wafer in the channel.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. An accelerometer, comprising:
   a wafer,
   a recess in said wafer,
   a proof mass integrated into said wafer and located in said recess,
   at least one spring member operatively connected to said proof mass,
   said proof mass having a proof mass surface and said proof mass surface being partially reflective,
   an optical fiber optically coupled to said partially reflective proof mass surface and positioned opposite said partially reflective proof mass surface,
   a partially reflective surface on said optical fiber that is positioned opposite said partially reflective proof mass surface,
   a gap between said partially reflective proof mass surface and said partially reflective surface on said optical fiber, and
   sensor means operatively connected to said optical fiber for detecting movement of said proof mass.

2. The accelerometer of claim 1, wherein said wafer is a silicon wafer.

3. The accelerometer of claim 1, wherein said proof mass is a microfabricated proof mass.

4. The accelerometer of claim 1, wherein said proof mass is a micromachined proof mass.

5. The accelerometer of claim 1, wherein said wafer contains a groove for receiving said optical fiber.

6. The accelerometer of claim 1, wherein said wafer includes a groove with an insertion funnel for receiving said optical fiber.

7. The accelerometer of claim 1, wherein said gap between said partially reflective proof mass surface and said partially reflective surface on said optical fiber provides a Fabry-Perot cavity between said partially reflective surface on said optical fiber and said partially reflective proof mass surface.

8. The accelerometer of claim 1, including means for encapsulating said wafer and said proof mass.

9. The accelerometer of claim 8, wherein said means for encapsulating said wafer and said proof mass includes a first side plate and a second side plate with said proof mass positioned between said first side plate and said second side plate in an aligned manner.

10. The accelerometer of claim 8, wherein said means for encapsulating said wafer and said proof mass includes a first glass side plate and a second glass side plate with said proof mass positioned between said first glass side plate and said second glass side plate.

11. The accelerometer of claim 9 wherein said proof mass is approximately rectangular with four corners and wherein said at least one spring member comprises four spring members with one of said four spring members located proximate each of the four corners of said proof mass.

12. The accelerometer of claim 9 wherein said proof mass is approximately rectangular with four corners and wherein said at least one spring member comprises eight spring members with two of said eight spring members located proximate each of the four corners of said proof mass.

13. The accelerometer of claim 1 wherein said wafer contains a groove for receiving said optical fiber and including adhesive wicking dump channels operatively connected to said groove.

14. An accelerometer, comprising:
   a wafer,
   a recess in said wafer,
   a proof mass located in said recess in said wafer,
   at least one spring member operatively connected to said proof mass, said proof mass having a proof mass surface and said proof mass surface being partially reflective, an optical fiber optically coupled to said partially reflective proof mass surface and positioned opposite said partially reflective proof mass surface, a partially reflective surface on said optical fiber that is positioned opposite said partially reflective proof mass surface, a gap between said partially reflective proof mass surface and said partially reflective surface on said optical fiber, and sensor means operatively connected to said optical fiber for detecting movement of said proof mass.

15. The accelerometer of claim 14, wherein said wafer is a silicon wafer.

16. The accelerometer of claim 14, wherein said proof mass is a microfabricated proof mass.

17. The accelerometer of claim 14, wherein said gap between said partially reflective proof mass surface and said partially reflective surface on said optical fiber provides a Fabry-Perot cavity between said partially reflective proof mass surface and said partially reflective surface on said optical fiber.

18. A method of producing an accelerometer, comprising the steps of:

microprocessing a wafer to have a recess, microprocessing said wafer to produce a proof mass located in said recess, microprocessing said wafer to produce at least one spring member, microprocessing said wafer to produce a channel for receiving an optical fiber, providing a partially reflective proof mass surface on said proof mass, positioning a first side plate and a second side plate adjacent said, wafer, said proof mass, said at least one spring member, and said channel and connecting said first side plate and said second side plate to said wafer, connecting an optical fiber to said wafer in said channel providing a partially reflective surface on said optical fiber and positioning said proof mass and said optical fiber in a position wherein said partially reflective surface on said optical fiber is opposite said partially reflective proof mass surface and there is a gap between said partially reflective surface on said optical fiber and said partially reflective proof mass surface.

19. The method of claim 18, wherein said step of positioning and connecting said a first side plate and a second side plate to said wafer comprises bonding said first side plate and said second side plate to said wafer.

20. The method of claim 19, wherein said step of bonding said first side plate and said second side plate to said wafer includes using a temperature-time profile during said bonding.

21. The method of claim 19, wherein said step of bonding said first side plate and said second side plate to said wafer comprises fusion at elevated temperatures.

22. The method of claim 19, wherein said step of bonding said first side plate and said second side plate to said wafer comprises anodic bonding.

23. The method of claim 18, wherein the steps of positioning said proof mass and said optical fiber in a position wherein said partially reflective surface on said optical fiber is opposite said partially reflective proof mass surface and there is a gap between said partially reflective surface on said optical fiber and said partially reflective proof mass surface provides a Fabry-Perot cavity between said partially reflective surface on said optical fiber and said partially reflective proof mass surface.

24. The method of claim 18, including the steps of providing sensor means for detecting movement of said proof mass optically coupled to said optical fiber.

25. The method of claim 18, including the steps of maintaining said wafer and said proof mass encapsulated during said step of microprocessing.

26. The method of claim 18, including the steps of maintaining said wafer and said proof mass encapsulated during processing and subsequently opening said encapsulated wafer and said proof mass.

27. The method of claim 26, wherein said step of opening said encapsulated wafer and said proof mass is accomplished by dry or clean etching a fiber opening in wafer.

* * * * *